Patented May 19, 1925.

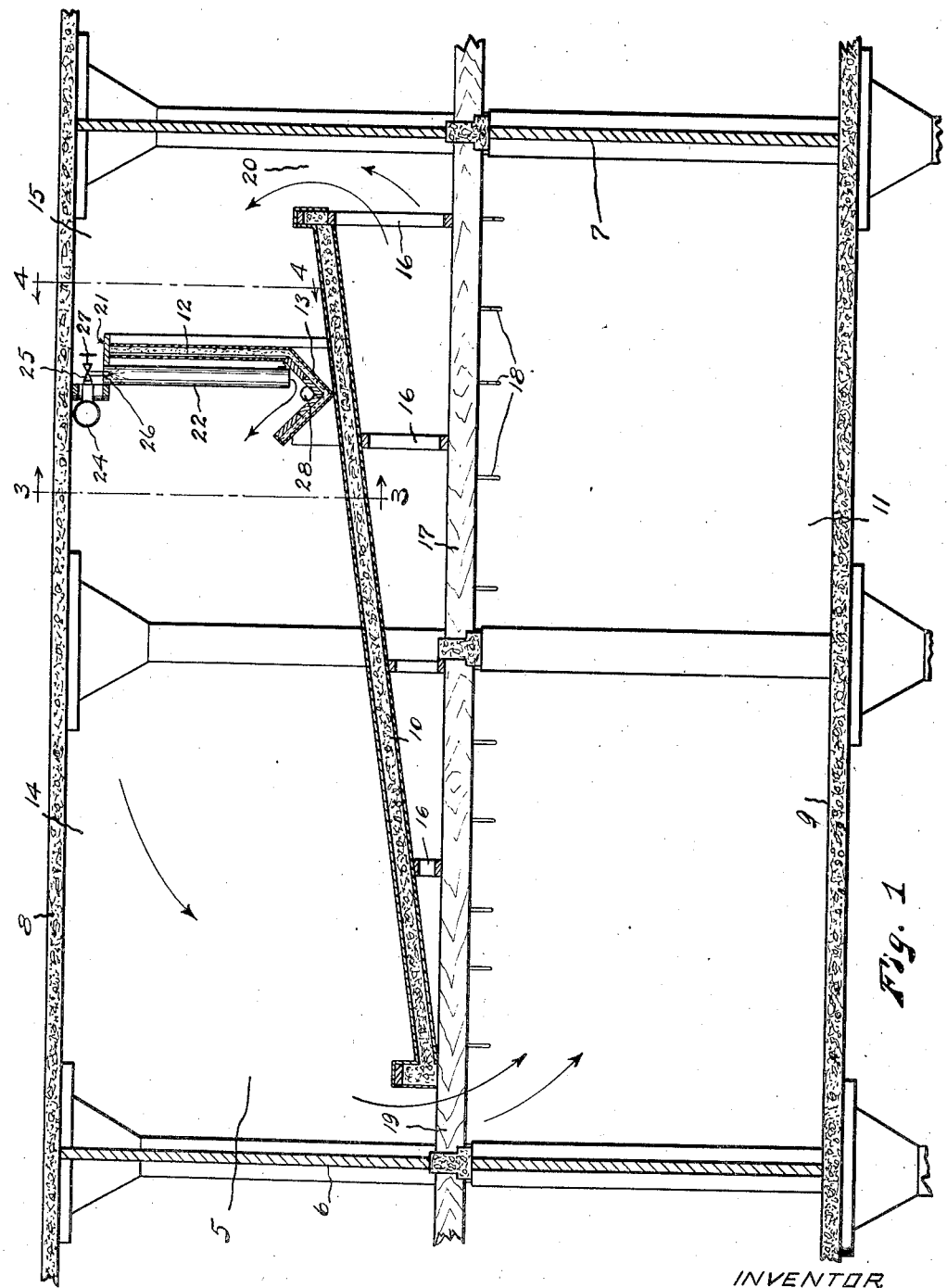

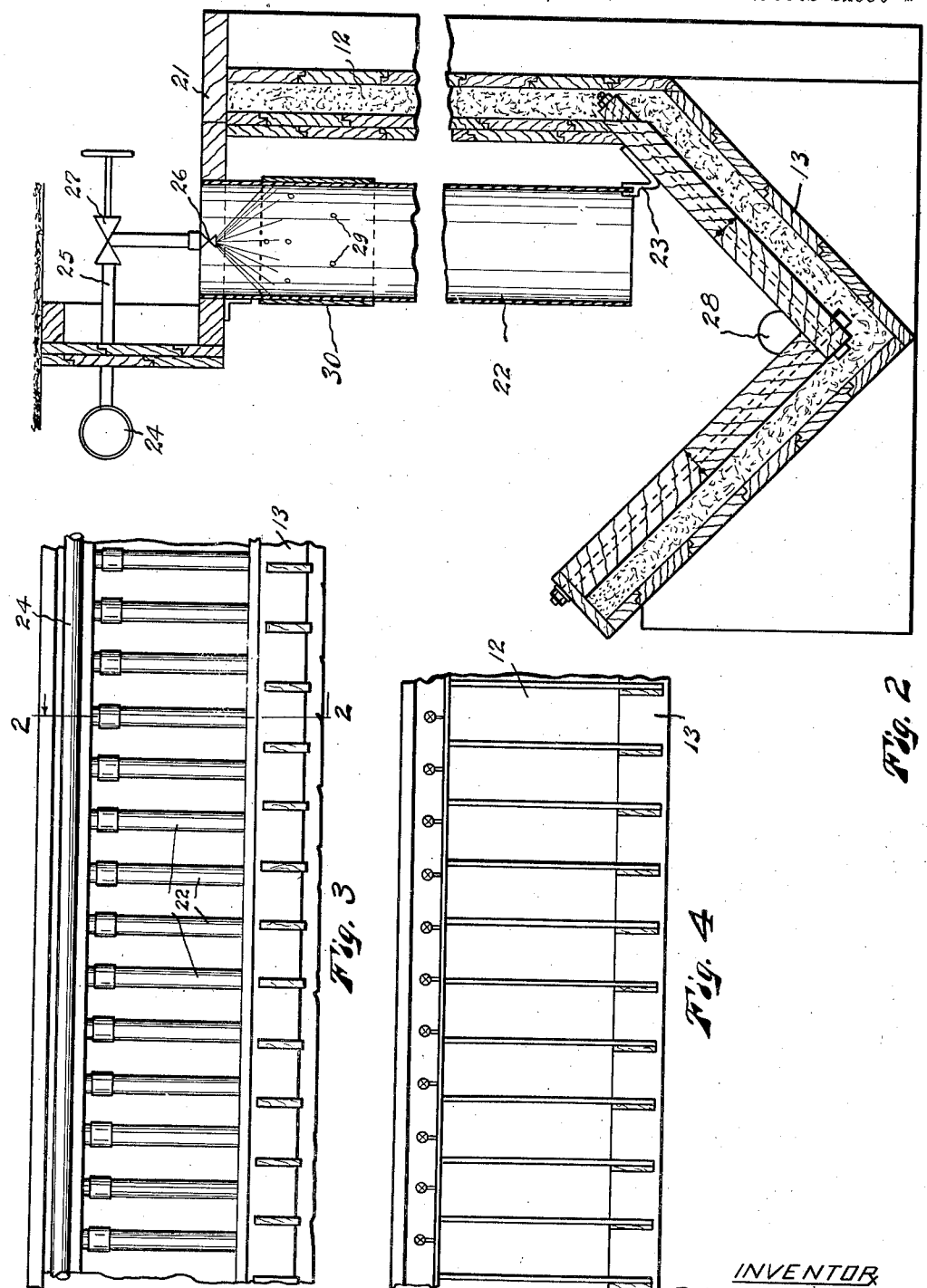

1,538,206

UNITED STATES PATENT OFFICE.

ROBERT BRUCE MUSSER, OF SEATTLE, WASHINGTON.

REFRIGERATING DEVICE.

Application filed May 19, 1924. Serial No. 714,286.

*To all whom it may concern:*

Be it known that I, ROBERT BRUCE MUSSER, a citizen of the United States, residing at Seattle, in the county of King and State of Washington, have invented a certain new and useful Refrigerating Device, of which the following is a specification.

My invention relates to the art of refrigerating devices. More particularly, my invention relates to a refrigerating device which provides; (a), for a one-way active positive circulation of the air in the cooler; (b), for a refrigerating means which reduces the moisture content of the air; and (c), eliminates the coating of the refrigerating means with ice.

For purposes of illustration, my invention will be explained by setting forth the same as applied to a meat preserving device, but it is not to be considered as limited to any such specific use, but includes all uses involving similar problems and conditions.

Circumstances may make it desirable to have the refrigerating means in a chamber commonly called a "loft" separated from the cooler, i. e., that part of the refrigerating compartment disposed to accommodate the products to be preserved. Many such refrigerating plants, as now built, have such lofts, and the same may be readily converted to embody my invention as herein set forth. Such refrigerating means, as heretofore designed, have been known generally as the "open brine" system. Serious objection obtains to such in that said system does not efficiently provide for removing the moisture content of the air in said compartment, and does not efficiently cool the air and provide for such active positive circulation as to prevent the condensation on the walls and ceiling of the cooler and the coating of the refrigerating means with ice.

These and other inherent objections, it is, in general, the primary object of my invention to overcome. A primary object of my invention is to provide a refrigerating device which embodies a cooler, in which the air, having its moisture content reduced, is actively positively circulated therethrough in one direction only at such a temperature that objectionable condensation on the walls or ceiling and coating the refrigerating means with ice is eliminated.

Further primary objects of my invention are to provide a refrigerating means which will prevent the coating of the coldest parts with ice, and provide a sanitary refrigerating device,—sanitary both as respects the parts being preserved, being characterized by a low humidity, and as respects the health of the employees.

The above mentioned general objects of my invention, together with others inherent in the same, are attained by the device illustrated in the following drawings, the same being merely a preferred exemplary form of embodiment of my invention, throughout which drawings like reference numerals indicate like parts:

Figure 1 is a view in vertical section of a refrigerating device embodying my invention;

Fig. 2 is a view in elevation and vertical section on dotted line 2, 2 of Fig. 3;

Fig. 3 is a view in elevation on line 3, 3 of Fig. 1; and

Fig. 4 is a view in elevation on line 4, 4 of Fig. 1.

A heat insulated compartment 5, formed by walls 6, 7, 8, and 9 (front and back walls not shown), is divided by heat insulated partition 10 horizontally disposed into a lower chamber or cooler 11 and an upper chamber or loft, divided by a vertically disposed partition 12, preferably formed in part by a portion of the heat insulated trough 13, into a forward loft chamber 14 and a back loft chamber 15. The partition 10 may be supported by the supporting members 16, resting upon beam 17, which may be provided with the meat hangers 18, and said partition 10 may be in spaced relation with the oppositely disposed walls 6 and 7 to provide air passages 19 and 20.

Partition 12 may be provided with a step 21, from which is suspended vertical cylinders 22, preferably supported by angle brackets 23 mounted on trough 13. Said cylinders 22 are preferably disposed in spaced relation with respect to that portion of partition 12 below step 21.

A refrigerating liquid supply pipe 24 is provided, preferably in the forward loft 14, having pipe connectors 25 with spray nozzles 26 axially disposed in the upper end portion of each of the vertical cylinders 22. Valve member 27 regulates the rate of flow of the refrigerating liquid. Withdrawal pipe 28 connects with trough 13.

Perforations 29 may be supplied in the upper end portions of the cylinders 22, and these may be surrounded by sleeve 30 disposed in spaced relation to the cylinders 22.

The mode of operation of a device embodying my invention is as follows: The refrigerating liquid from supply pipe 24 is forcibly jetted into cylinders 22, and said liquid is disposed as a coating over the inside surface of said cylinders. The liquid is discharged into the trough 13, from which it is withdrawn through withdrawal pipe 28. The jetting action forcibly draws or sucks in the relatively warm air from the back loft chamber 15 and thoroughly removes the heat therefrom, ejecting the cold air from the bottom of said cylinders 22, which cylinders constitute the only direct communication means between the back and forward loft chambers. The cold air then passes downwardly through passageway 19 to the cooler 11, through which it is positively actuated by reason of the suction created by the jetting action already described, so that after it absorbs the heat from the products in the cooler, it passes upwardly through passageway 20. The jetting action is supplemented in creating the flow of air by gravity,—cold air naturally falling to the lower levels while warm air naturally rises. Thus, an active positive circulation is created, which maintains an efficient refrigeration in the cooler, and prevents objectionable condensation on the under side of partition 10, which forms the ceiling of the cooler 11. The moisture absorbed in cooling the products in the cooler 11 is promptly conveyed to the back loft chamber and condensed in the cylinders 22 during the exposure thereof to the refrigerating fluid, in which fluid the said moisture is withdrawn by pipe 28 from the compartment 5.

This condensing and removing of the moisture content from the air by the means of refrigerating herein set forth cooperates with the positive circulating of the air to prevent objectionable condensation on the ceiling of the cooler, which occurs in refrigerating means of the "loft" type of present practice design. Moreover, the keeping of the refrigerating fluid in the trough and not allowing it to run down the upper surface of the partition 10 keeps from rendering said partition so cold that it condenses the said moisture content to any objectionable extent. Practically considered, such condensation is eliminated in the device embodying my invention.

Although cylinder 22 is preferably disposed in the forward loft, where the temperature of the air is cold, nevertheless, there is a tendency to form an ice coating on the upper portion of the cylinder. To prevent this, I preferably provide perforations 29 in the upper end portions of the cylinder 22. This results in a portion of the refrigerating liquid flowing down the outside of the pipe and supplying it with a non-freezing coating, so that the difficulty of an ice coating forming thereon is eliminated. To cause this liquid to operate evenly over the outer surface of the cylinder and to keep the same from splashing out into the chamber, sleeve 30 is preferably provided. The amount of said liquid flowing down the outside is kept to a minimum and just sufficient to maintain the temperature on the outside of such a degree as to avoid the tendency to form a coating of ice thereon.

Obviously, changes may be made in the form, dimensions and arrangement of the parts of my invention, without departing from the principle thereof, the above setting forth only a preferred form of embodiment.

I claim:

1. A vertical tube spray refrigerating device embodying a compartment; a partition horizontally disposed in said compartment in spaced relation to oppositely disposed walls of said compartment, dividing said compartment into an upper (loft) chamber and a lower (cooler) chamber, said spaced relation providing air passages from said loft to said cooler on one side of said partition and an air passage from said cooler to said loft on the other side of said partition; a second partition dividing said loft into a forward loft and a back loft; one or more vertically disposed cylinders operatively disposed with respect to said partition; a nozzle disposed in the upper end portion of said cylinder or cylinders, whereby refrigerating fluid may be jetted into said cylinder or cylinders; and a collecting means at the bottom of said cylinder or cylinders whereby a refrigerating fluid may be collected and whereby the air in said compartment may be cooled and discharged from said forward loft into said cooler, through the cooler and from said cooler into said back loft and down said cylinder or cylinders.

2. A vertical tube spray refrigerating device embodying a compartment; a partition horizontally disposed in said compartment in spaced relation to oppositely disposed walls of said compartment, dividing said compartment into an upper (loft) chamber and a lower (cooler) chamber, said spaced relation providing air passages from said loft to said cooler on one side of said partition and an air passage from said cooler to said loft on the other side of said partition; a second partition dividing said loft into a forward loft and a back loft; one or more vertically disposed cylinders operatively disposed with respect to said partition; a nozzle disposed in the upper end portion of said cylinder or cylinders, whereby refrigerating fluid may be jetted into said cylinder or cylinders; means whereby refrigerating fluid may be supplied to the exterior surface of said cylinder; and a collecting means at the bottom of said cylinder or cylinders, whereby a refrigerating fluid may be collected and whereby the air in said compartment may be cooled and discharged from said forward loft into said cooler, through the cooler and from said cooler into said back loft and down said cylinder or cylinders.

3. A vertical tube spray refrigerating device embodying a compartment; a partition horizontally disposed in said compartment in spaced relation to oppositely disposed walls of said compartment, dividing said compartment into an upper (loft) chamber and a lower (cooler) chamber, said spaced relation providing air passages from said loft to said cooler on one side of said partition and an air passage from said cooler to said loft on the other side of said partition; a second partition dividing said loft into a forward loft and a back loft; one or more vertically disposed cylinders in said loft, said cylinder or cylinders having perforations in the upper portion thereof; a nozzle disposed on the upper end portion of said cylinder or cylinders, whereby refrigerating fluid may be jetted into said cylinder or cylinders, and a portion thereof caused to flow down the outside of said cylinder or cylinders, as well as down the inside of said cylinder or cylinders; and a collecting means at the bottom of said cylinder or cylinders, whereby a refrigerating fluid may be collected in said collecting means, and whereby the air in said compartment may be cooled and discharged from said forward loft into said cooler, through the cooler and from said cooler into said back loft and down said cylinder or cylinders.

4. A vertical tube spray refrigerating device embodying a compartment; a partition horizontally disposed in said compartment in spaced relation to oppositely disposed walls of said compartment, dividing said compartment into an upper (loft) chamber and lower (cooler) chamber, said spaced relation providing air passages from said loft to said cooler on one side of said partition and an air passage from said cooler to said loft on the other side of said partition; a second partition dividing said loft into a forward loft and a back loft; one or more vertically disposed cylinders in said loft, said cylinder or cylinders having perforations in the upper portion thereof; a sleeve disposed in spaced relation to said cylinder or cylinders adjacent said perforations; a nozzle disposed in the upper end portion of said cylinder or cylinders, whereby refrigerating fluid may be jetted into said cylinder or cylinders, and a portion thereof caused to flow down the outside of said cylinder or cylinders, as well as down the inside of said cylinder or cylinders; and a collecting means at the bottom of said cylinder or cylinders, whereby a refrigerating fluid may be collected in said collecting means, and whereby the air in said compartment may be cooled and discharged from said forward loft into said cooler, through the cooler and from said cooler into said back loft and down said cylinder or cylinders.

5. In combination with a refrigerating device embodying a compartment, a vertically disposed cylinder; a nozzle axially disposed in the upper end portion of said cylinder; means whereby refrigerating fluid may be supplied to the exterior surface of said cylinder; and a collecting means at the bottom of said cylinder, whereby a refrigerating fluid may be jetted from said nozzle against the walls of said cylinder and collected in said collecting means.

6. In combination with a refrigerating device embodying a compartment, a vertically disposed cylinder having perforations in the upper portion thereof; a nozzle axially disposed in the upper end portion of said cylinder, whereby refrigerating fluid may be jetted into said cylinder or cylinders, and a portion thereof caused to pass through said perforations and flow down the outside of said cylinder; and a collecting means at the bottom of said cylinder.

7. In combination with a refrigerating device embodying a compartment, a vertically disposed cylinder having perforations in the upper portion thereof; a sleeve disposed in spaced relation to said cylinder adjacent said perforations; a nozzle axially disposed in the upper end portion of said cylinder, whereby refrigerating fluid may be jetted into said cylinder or cylinders, and a portion thereof caused to pass through said perforations and flow down the outside of said cylinder; and a collecting means at the bottom of said cylinder.

8. In combination with a refrigerating device embodying a compartment; a partition horizontally disposed in said compartment in spaced relation to oppositely disposed walls of said compartment, dividing said compartment into an upper (loft) chamber and a lower (cooler) chamber, said spaced relation providing air passages from said loft to said cooler on one side of said partition and an air passage from said cooler to said loft on the other side of said partition; a second partition dividing said loft into a forward loft and a back loft; and refrigerating means operatively disposed with respect to said partition, whereby the only communication between the back loft and the forward loft is through said refrigerating means.

In witness whereof, I hereunto subscribe my name this ninth day of May, 1924.

ROBERT BRUCE MUSSER.